United States Patent
Salter et al.

(10) Patent No.: US 12,491,830 B2
(45) Date of Patent: Dec. 9, 2025

(54) AUTOMATIC RESET OF VEHICLE MODULES

(71) Applicant: Ford Global Technologies, LLC, Dearborn, MI (US)

(72) Inventors: Stuart C. Salter, White Lake, MI (US); William David Treharne, Ypsilanti, MI (US); David Celinske, Wolverine Lake, MI (US); Paul Braithwaite, Wanstead (GB); Daniel Luke Rabideau, Saline, MI (US); Sheran Anthony Alles, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/606,729

(22) Filed: Mar. 15, 2024

(65) Prior Publication Data

US 2025/0289385 A1 Sep. 18, 2025

(51) Int. Cl.
*B60R 16/023* (2006.01)
*B60R 16/033* (2006.01)

(52) U.S. Cl.
CPC ........ *B60R 16/0238* (2013.01); *B60R 16/033* (2013.01)

(58) Field of Classification Search
CPC .......................... B60R 16/0238; B60R 16/033
USPC ....................................................... 307/10.1
See application file for complete search history.

(56) References Cited

U.S. PATENT DOCUMENTS

| | | | |
|---|---|---|---|
| 6,362,599 B1 | 3/2002 | Turner et al. | |
| 10,400,733 B2 | 9/2019 | Chen et al. | |
| 10,780,847 B2 * | 9/2020 | Takamatsu | B60R 16/0207 |
| 2004/0227402 A1 * | 11/2004 | Fehr | B60R 16/0315 307/10.1 |
| 2014/0172190 A1 | 6/2014 | Kalinadhabhotla et al. | |
| 2016/0059708 A1 * | 3/2016 | Iwasaki | B60R 16/03 307/10.1 |
| 2018/0074880 A1 * | 3/2018 | Hartmann | H03K 17/16 |
| 2018/0123357 A1 | 5/2018 | Beaston et al. | |
| 2019/0176639 A1 | 6/2019 | Kumar et al. | |

FOREIGN PATENT DOCUMENTS

| | | |
|---|---|---|
| CN | 111717070 A | 9/2020 |
| CN | 115167609 A | 10/2022 |
| CN | 115333159 B | 2/2023 |
| DE | 102014204512 A1 | 9/2014 |
| DE | 102015118659 A1 | 5/2017 |
| DE | 202022101900 U1 | 5/2022 |
| DE | 102020131643 A1 | 6/2022 |
| EP | 4032180 A1 | 7/2022 |
| WO | 2019037804 A1 | 2/2019 |

* cited by examiner

*Primary Examiner* — Michael R. Fin
(74) *Attorney, Agent, or Firm* — Frank Lollo; Brooks Kushman P.C.

(57) ABSTRACT

Responsive to indication a user of a vehicle has provided input to an interface of the vehicle, electrical connections between a power distribution center and components of an electrical system of the vehicle are disconnected except an electrical connection between the power distribution center and an auxiliary battery of the electrical system.

17 Claims, 3 Drawing Sheets

AUTOMATIC RESET OF VEHICLE MODULES

TECHNICAL FIELD

This disclosure relates to automotive power systems.

BACKGROUND

Automobiles are transitioning from purely mechanical devices to entities that rely heavily on electrical and electronic systems. These systems assist in executing a wide range of functions, from igniting an engine (when present) to powering advanced driver-assistance systems (ADAS) and contributing to efficiency of the vehicle. The transition towards electric vehicles (EVs) and hybrid electric vehicles (HEVs) acts to expand the role of electrical systems in automotive engineering.

SUMMARY

A vehicle has an automotive electrical system including a power distribution center with a microcontroller and a plurality of switches, an auxiliary battery that can be electrically connected with the power distribution center via a first of the switches, and primary and secondary DC/DC converters that each can be electrically connected with the power distribution center via second and third of the switches, respectively. The power distribution center opens, for a predefined period, the second, third, and at least some of other of the switches but not the first of the switches responsive to indication a user has requested a reset of the automotive electrical system such that power from the auxiliary battery flows to the power distribution center but not to the primary and secondary DC/DC converters, and responsive to expiration of the predefined period, closes the third of the switches to electrically reconnect the secondary DC/DC converter with the power distribution center before closing other of the switches.

A method includes, responsive to indication a user of a vehicle has provided input to an interface of the vehicle, disconnecting electrical connections between a power distribution center and components of an electrical system of the vehicle except an electrical connection between the power distribution center and an auxiliary battery of the electrical system such that power from the auxiliary battery flows to the power distribution center but not the components.

An automotive electrical system includes an auxiliary battery, protected and main DC/DC converters, and a power distribution center including a microcontroller that, responsive to indication a user has requested a reset of the automotive electrical system, disconnects for a predetermined period electrical connections between the protected and main DC/DC converters and the power distribution center while maintaining an electrical connection between the auxiliary battery and power distribution center, and after expiration of the predetermined period, reconnects the protected and main DC/DC converters with the power distribution center.

DETAILED DESCRIPTION

Figure 1:
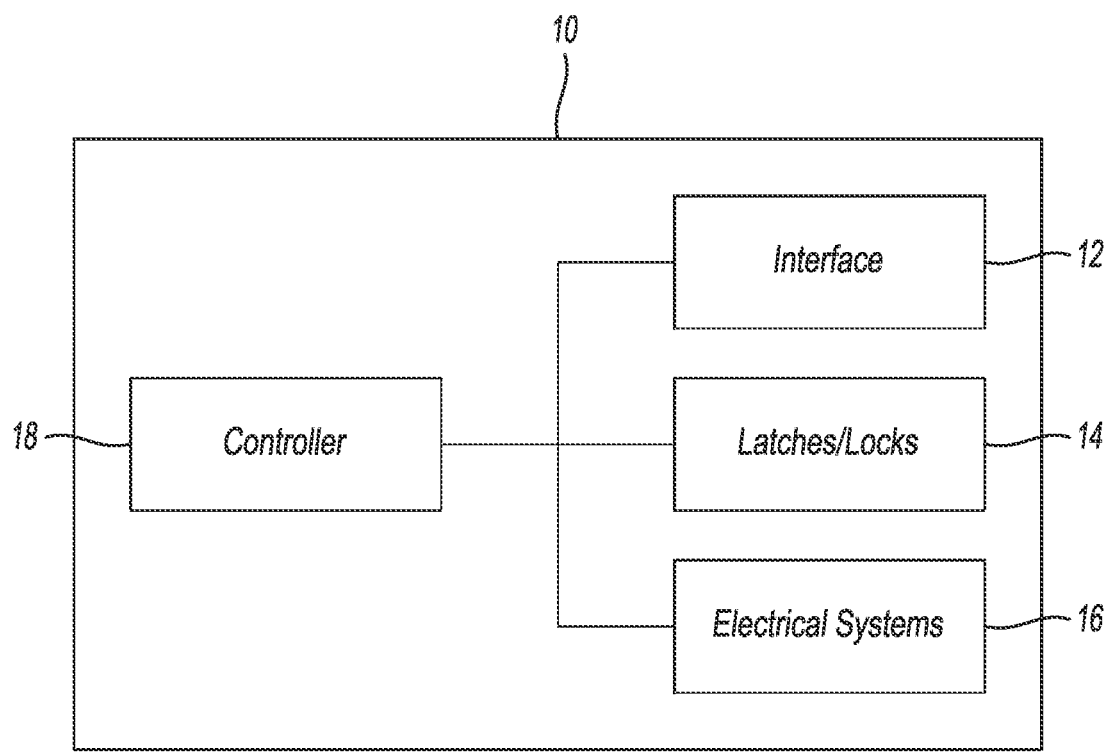
FIG. 1 is a block diagram of portions of a vehicle.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Central to a vehicle's electrical system is the battery, a primary source of electrical energy in both conventional and electric vehicles. Conventional vehicles utilize a 12V battery primarily for igniting the engine and powering auxiliary components when the engine is inactive. EVs and HEVs, however, may employ two distinct battery systems: a standard 12V battery for low-voltage electrical loads like lighting and infotainment systems, and a high-capacity traction battery, typically lithium-ion, for propulsion.

Modern battery management systems (BMS) monitor and control the battery's state of charge and health. The BMS is an electronic system itself, using sensors and algorithms to predict the battery's behavior and manage its environment.

Another component in the vehicle's electrical architecture is the DC/DC converter. These converters manage the power distribution within the vehicle, particularly in EVs and HEVs, where they adjust voltage levels between different parts of the electrical system. For instance, a high-voltage battery pack might feed the electric motor, while a lower voltage system powers the lights, infotainment, and other auxiliary systems. Some vehicles may thus have multiple DC/DC converters (e.g., main DC/DC converter, protected DC/DC converter, etc.). The DC/DC converters work such that each subsystem receives power at the appropriate voltage level.

A main DC/DC converter facilitates vehicle propulsion in EVs and HEVs by adjusting voltage (e.g., reducing) from a high-voltage battery for an electric machine, which then transforms received electrical energy to mechanical energy to move wheels. Certain main DC/DC converters may also play a role in regenerative braking systems. During braking, the electric motor operates as a generator, converting kinetic energy back into electrical energy, which is then stored in the high-voltage battery. The DC/DC converter adjusts the generated voltage to the battery's charging level, increasing the energy recovery.

A protected DC/DC converter may include built-in features to handle electrical issues like overcurrent, overvoltage, under-voltage, and over-temperature conditions. These converters, in certain arrangements, may ensure stable voltage supply from the high-voltage battery or other power source to the vehicle's low-voltage systems.

A power distribution center (PDC), an electrical hub, can be responsible for distributing electrical power to various vehicle components and systems. It often houses fuses, relays, and circuit breakers, acting as a centralized point for electrical energy management. The PDC thus assists in routing power throughout portions of the vehicle.

A vehicle's electrical system may also encompass a wide array of sensors, actuators, and control units, all interconnected through a complex wiring harness. These components work to monitor the vehicle's environment, execute control strategies, and provide feedback to the driver. For example, sensors might detect the vehicle's speed, engine temperature, or external obstacles, informing systems like the engine control unit (ECU) if present or ADAS to take appropriate action, whether it is adjusting the fuel injection rate or applying emergency braking.

The integration of advanced electronics has also paved the way for infotainment systems, enhancing the passenger experience with features like virtual interfaces, navigation, connectivity, and multimedia playback. These systems rely on the vehicle's electrical infrastructure, drawing power and interfacing with other electronic modules.

The role of electrical and electronic systems is set to expand further, with advancements in autonomy, connectivity, and efficiency. The shift towards software-defined vehicles for example, where features and functions can be updated or added through software updates, highlights the growing role of these systems. Vehicle module software, however, may need to be occasionally reset via the depowering of corresponding hardware (i.e., a hard reset). In certain vehicle architectures, this may involve removal of cabin components (e.g., bench) to gain access to key electrical system connectors, which need to be physically disconnected and then reconnected.

Here, we contemplate a hard reset procedure for certain vehicle components initiated via driver demand (e.g., virtual button push) without physically disconnecting related batteries or DC/DC converters. This strategy provides a hardware reset of most vehicle modules, except the PDC, without manually removing connection to an auxiliary battery (e.g., 12V battery) and protected DC/DC converter. The health of the auxiliary battery can be checked first via the BMS or other onboard diagnostic system. Continuous checking of the battery's voltage, current flow, and in some cases, internal resistance, using sensors and algorithms may reveal patterns suggesting the auxiliary battery is underperforming. If all is not as expected, a variation that leaves the protected DC/DC converter running may be performed. Otherwise, doors can be unlocked/unlatched, and frunks may be unlatched to allow access to various vehicle compartments and components, including the auxiliary battery. The protected DC/DC converter, ultracapacitor, and main DC/DC may be shut down, and switches in the PDC, except to the auxiliary battery, may be opened. Thus, only the PDC is still powered from the auxiliary battery. That is, everything in the vehicle would have no power except the PDC. The system may then wait some predetermined period (e.g., 5 minutes) to allow certain capacitors in each module to fully drain before beginning restart. The driver may be kept fully informed about the process and how long it will take via a virtual interface, etc. The PDC may then boot the vehicle using a standard sequence.

The booting of vehicle power systems, orchestrated by a designated central control unit, is typically done in sequence. This process first energizes certain primary components and systems like DC/DC converters, followed by the gradual activation of auxiliary systems like infotainment, climate control, and lighting. This staging prioritizes functionality.

Referring to FIG. 1, a vehicle 10 includes an interface 12, latches/locks 14, electrical systems 16, and a controller 18 (i.e., one or more controllers). The controller 18 is in communication with/exerts control over the interface 12, latches/locks 14, and electrical systems 16. Such interaction may be facilitated via a serial bus (e.g., Controller Area Network (CAN)) or via discrete conductors. The controller 18 may be further programmed to enable wireless communication with various entities (e.g., a server) via a wireless network (e.g., a cellular network), etc.

The interface 12 facilitates user interaction and functionality. It can take the form of physical buttons and switches for manual control of features like climate and audio systems, to touchscreens that centralize access to navigation, entertainment, and vehicle settings. Voice command interfaces are also contemplated, allowing drivers to perform tasks hands-free. Gesture control may also be used, enabling commands through predefined hand movements. Haptic feedback, providing tactile responses to touch inputs, may further be used.

The latches/locks 14 can include a variety of types to secure doors, frunks, and other compartments. Traditional mechanical latches and locks may be used. Electronic locks controlled via fobs or smart entry systems, enabling remote locking and unlocking, are also possible. For frunks and other compartments, specialized latches may include additional features like release mechanisms.

Figure 2:
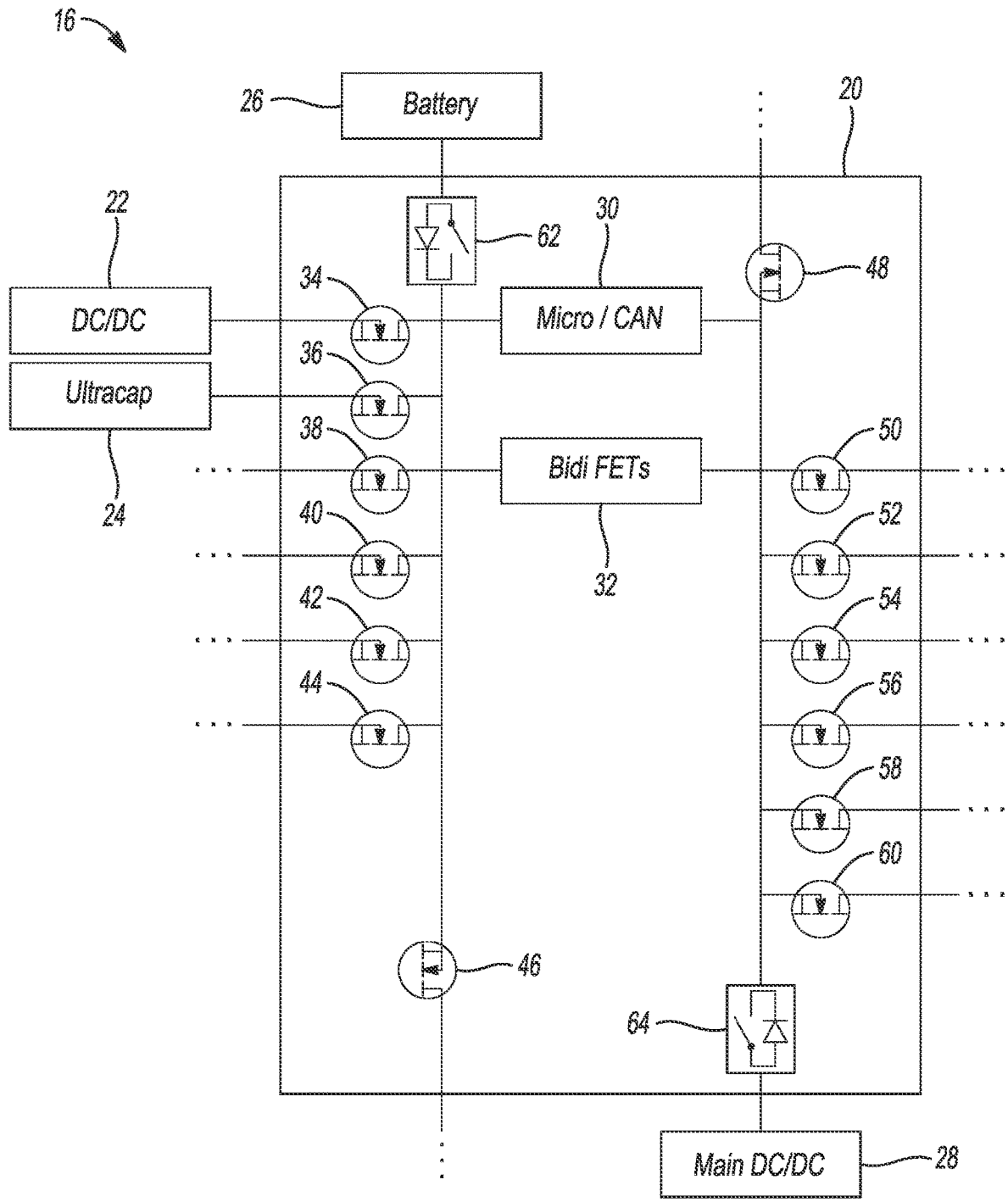
FIG. 2 is a block diagram of portions of an electrical system of the vehicle of FIG. 1.

As suggested above, the electrical systems 16 may include a variety of components. Referring to FIGS. 1 and 2, the electrical system 16 includes, among other things in this example, a PDC 20, a protected (secondary) DC/DC converter 22, an ultracapacitor 24, an auxiliary battery 26, and a main (primary) DC/DC converter 28. As explained in further detail below, the PDC 20 can be connected with each of the protected DC/DC converter 22, ultracapacitor 24, auxiliary battery 26, and main DC/DC converter 28.

The PDC 20 includes a micro controller/CAN interface 30, bidirectional field effect transistors 32, and field effect transistors 34, 36, 38, 40, 42, 44, 46, 48, 50, 52, 54, 56, 58, 60, 62, 64. The micro controller/CAN interface 30 implements the control strategies contemplated herein, and is connected between the field effect transistors 34, 36, 38, 40, 42, 44, 46, 62 and the field effect transistors 48, 50, 52, 54, 56, 58, 60, 64. The bidirectional field effect transistors 32 are similarly connected. The field effect transistors 34, 36 facilitate connection between the PDC 20 and protected DC/DC converter 22 and ultracapacitor 24, respectively. The field effect transistor 62 facilitates connection between the PDC 20 and auxiliary battery 26. The field effect transistor 64 (e.g., 280A continuous) facilitates connection between the PDC 20 and main DC/DC converter 28. The other field effect transistors may facilitate connection with various other vehicle components and modules, which are not mentioned for the sake of brevity.

Figure 3:
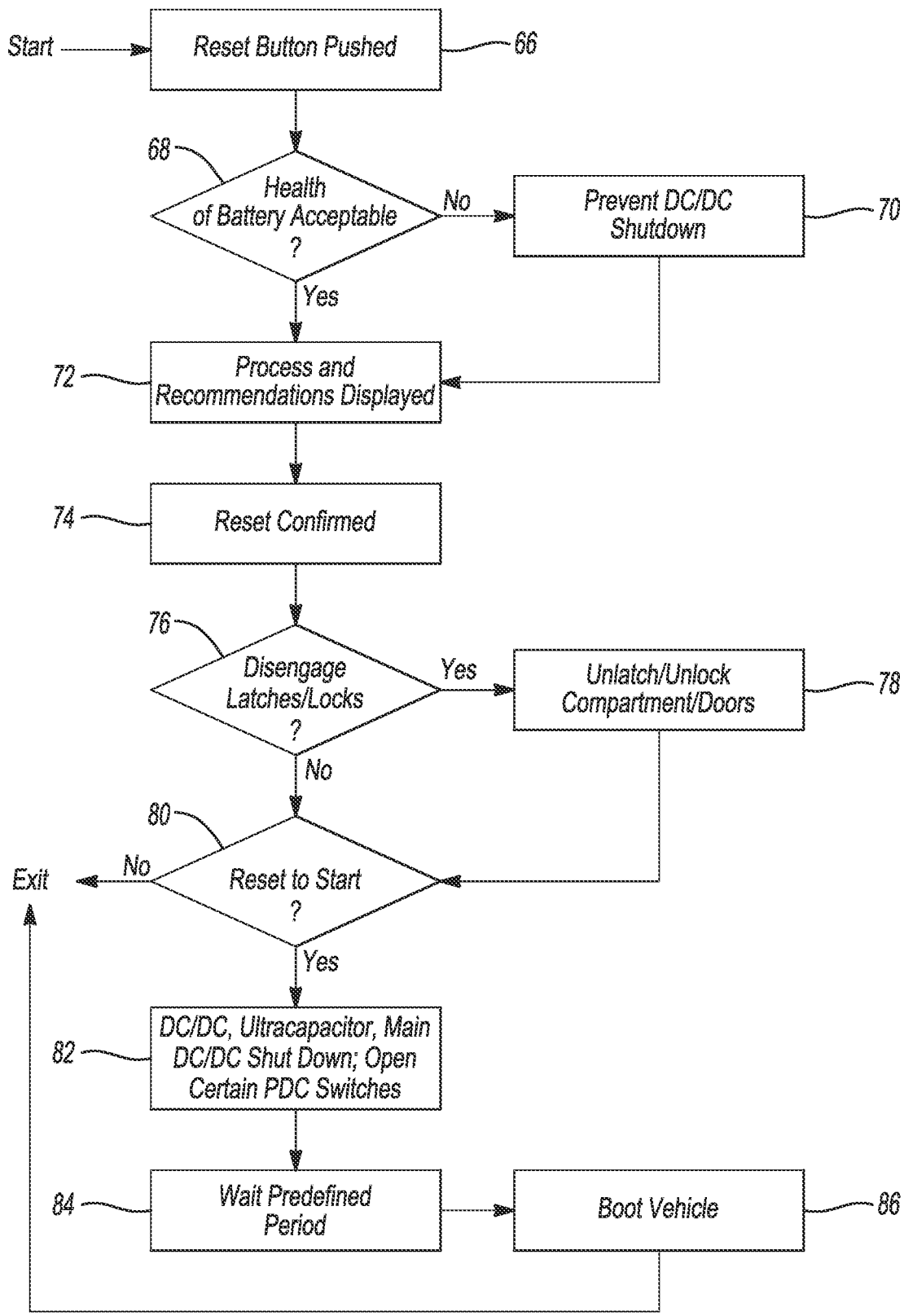
FIG. 3 is a flow chart of an algorithm for resetting modules of the vehicle of FIG. 1.

Referring to FIGS. 2 and 3, the process begins in this example with activation of a reset button at operation 66. The driver may "press" a virtual button displayed via the interface 12. The health of the auxiliary battery 26 is checked at operation 68. The controller 18, using the strategies described above, may evaluate the auxiliary battery 26. If not acceptable, shutdown of the protected DC/DC converter 22 is prevented. The PDC 20 may set a flag to prevent such shutdown. The algorithm then proceeds to operation 72. If acceptable, the process and recommendations are then displayed at operation 72. A description of the steps involved in the reset process may be presented to the driver via the interface 12, along with recommendations for unlocking/ unlatching various doors/compartments/etc. At operation 74, the driver confirms they wish to proceed with the reset. The driver may again "press" a virtual button displayed via the interface 12. Disengagement of the latches/locks 14 is offered at operation 76. The interface 12 may query the driver regarding whether they wish to unlock the doors or frunk. If the driver confirms they wish the latches/locks 14 to be disengaged, the corresponding compartments/doors are unlatched/unlocked at operation 78. The controller 18 may command the latches/locks 14 to open. The algorithm then proceeds to operation 80. If the driver indicates they do not wish the latches/locks 14 to be disengaged, confirmation of the reset is requested at operation 80. The interface 12 may query the driver regarding whether they wish the reset to begin immediately. If no, the algorithm exits. If yes, the protected DC/DC converter 22 (assuming the flag was not set at operation 70), ultracapacitor 24, and main DC/DC converter 28 are shut down, and certain switches of the PDC 20 are opened at operation 82. The PDC 20 may command the protected DC/DC converter 22, ultracapacitor 24, and main DC/DC converter 28 to shut down, and the PDC 20 may open the field effect transistors 34, 36, 38, 40, 42, 44, 46, 48, 50, 52, 54, 56, 58, 60, 64 (but not the field effect transistor 62) such that only the PDC 20 receives power from the auxiliary battery 26. Waiting is performed for a predefined period at operation 84. The PDC 20 may initiate a timer once operation 82 is complete. After 6 minutes has passed for example, the algorithm may proceed to operation 86, in which the vehicle is booted by the PDC 20 in normal sequence starting with the protected DC/DC converter 22.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. After the protected DC/DC converter 22, ultracapacitor 24, and main DC/DC converter 28 are shut down, and certain switches of the PDC 20 are opened, the strategy may pause to permit replacement of the auxiliary battery 26. Thereafter, the 20 PDC may check whether a battery replacement flag has been set and query the driver to confirm the auxiliary battery 26 has been replaced. If so, related sensors of the BMS may be reset to a new battery state.

The words used in the specification are words of description rather than limitation, and it is understood that various changes may be made without departing from the spirit and scope of these disclosed materials. As alluded to above, the terms "controller" and "controllers," for example, can be used interchangeably as the functionality of a controller or microcontroller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an automotive electrical system including a power distribution center with a microcontroller and a plurality of switches, an auxiliary battery configured to be electrically connected with the power distribution center via a first of the switches, and primary and secondary DC/DC converters each configured to be electrically connected with the power distribution center via second and third of the switches, respectively, the power distribution center being programmed to open, for a predefined period, the second, third, and at least some of other of the switches but not the first of the switches responsive to indication a user has requested a reset of the automotive electrical system such that power from the auxiliary battery flows to the power distribution center but not to the primary and secondary DC/DC converters, and responsive to expiration of the predefined period, to close the third of the switches to electrically reconnect the secondary DC/DC converter with the power distribution center before closing other of the switches.

2. The vehicle of claim 1, wherein the power distribution center is further programmed to open, for a predefined period, the second and the at least some of the other of the switches but not the first and third of the switches responsive to the indication and a health of the auxiliary battery.

3. The vehicle of claim 1 further comprising latches and locks, wherein the power distribution center is further programmed to unlatch the latches and unlock the locks after the indication.

4. The vehicle of claim 1 further comprising an interface configured to permit the user to input the indication.

5. The vehicle of claim 4, wherein the interface is further configured to display information related to the reset.

6. The vehicle of claim 1, wherein the secondary DC/DC converter is a protected DC/DC converter.

7. The vehicle of claim 1, wherein the auxiliary battery is a 12V battery.

8. A method comprising:
responsive to indication a user of a vehicle has provided input to an interface of the vehicle, disconnecting electrical connections between a power distribution center and components, including a DC/DC converter and an ultracapacitor, of an electrical system of the vehicle except an electrical connection between the power distribution center and an auxiliary battery of the electrical system such that power from the auxiliary battery flows to the power distribution center but not the components; and upon expiration of a predetermined period that begins with the disconnecting, reconnecting the components with the power distribution center, including reconnecting the DC/DC converter before the ultracapacitor, such that power from the auxiliary battery flows from the auxiliary battery through the power distribution center and to some of the components.

9. The method of claim 8, wherein the DC/DC converter is a protected DC/DC converter.

10. The method of claim 8 further comprising, after the indication, unlatching latches of the vehicle or unlocking locks of the vehicle.

11. The method of claim 8 further comprising displaying information via the interface related to the disconnecting.

12. The method of claim 8 further comprising disconnecting the electrical connections except the electrical connection between the power distribution center and auxiliary battery, and an electrical connection between the power distribution center and a protected DC/DC converter.

13. The method of claim 8, wherein the indication is related to changing the auxiliary battery.

14. An automotive electrical system comprising:
an auxiliary battery;
protected and main DC/DC converters; and
a power distribution center including a microcontroller programmed to, responsive to indication a user has requested a reset of the automotive electrical system, disconnect for a predetermined period electrical connections between the protected and main DC/DC converters and the power distribution center while maintaining an electrical connection between the auxiliary battery and power distribution center, and after expiration of the predetermined period, reconnect the protected and main DC/DC converters with the power distribution center.

15. The automotive electrical system of claim 14, wherein the microcontroller is further programmed to reconnect the protected DC/DC converter before the main DC/DC converter.

16. The automotive electrical system of claim 14, wherein the microcontroller is further programmed to, after the indication, unlatch latches or unlock locks associated with the automotive electrical system.

17. The automotive electrical system of claim 14, wherein the microcontroller is further programmed to generate output for display about the reset.

* * * * *